(12) United States Patent
Ke

(10) Patent No.: US 9,430,431 B2
(45) Date of Patent: Aug. 30, 2016

(54) MULTI-PART ELECTRONIC DEVICE AND DATA TRANSMISSION METHOD

(75) Inventor: Haibin Ke, Beijing (CN)

(73) Assignees: LENOVO (BEIJING) LIMITED, Beijing (CN); Beijing Lenovo Software Ltd., Beijing (CN)

( * ) Notice: Subject to any disclaimer, the term of this patent is extended or adjusted under 35 U.S.C. 154(b) by 563 days.

(21) Appl. No.: 13/995,536

(22) PCT Filed: Dec. 20, 2011

(86) PCT No.: PCT/CN2011/084283
§ 371 (c)(1),
(2), (4) Date: Jun. 19, 2013

(87) PCT Pub. No.: WO2012/083839
PCT Pub. Date: Jun. 28, 2012

(65) Prior Publication Data
US 2013/0275645 A1 Oct. 17, 2013

(30) Foreign Application Priority Data
Dec. 20, 2010 (CN) .......................... 2010 1 0612356

(51) Int. Cl.
*G06F 13/14* (2006.01)
*G06F 13/40* (2006.01)
(Continued)

(52) U.S. Cl.
CPC ............. *G06F 13/40* (2013.01); *G06F 13/385* (2013.01); *G06F 13/4282* (2013.01); *G06F 2213/0016* (2013.01); *G06F 2213/0042* (2013.01)

(58) Field of Classification Search
USPC .................................................. 710/300–315
See application file for complete search history.

(56) References Cited

U.S. PATENT DOCUMENTS 5,764,924 A * 6/1998 Hong ................... G06F 13/4045
710/300
5,941,968 A * 8/1999 Mergard ............. G06F 13/4022
710/308

(Continued)

FOREIGN PATENT DOCUMENTS

CN 1987791 A 6/2007
CN 101093448 A 12/2007

OTHER PUBLICATIONS

International Search Report issued in PCT/CN2011/084283 mailed Mar. 22, 2012 (4 pages).

(Continued)

*Primary Examiner* — Raymond Phan
(74) *Attorney, Agent, or Firm* — Osha • Liang LLP

(57) ABSTRACT

Embodiments of the present invention relate to electronic devices and data transmission methods. The electronic device includes: a first part including a first main board, a first processor connected to the first main board, at least one sharable hardware component and a first connector; and a second part including a second main board, a second processor connected to the second main board and a second connector corresponding to the first connector. The first part and the second part are connectable to each other via the first connector and the second connector. The first connector is configured to receive, from a first driving module of the hardware component, a first data sent from the hardware component via a first connector driving module, and transmit the first data to the second connector such that a second connector driving module can provide the first data from the second connector to a first application running in the second part via a second driving module of the hardware component. The present invention realizes simple and effective sharing of hardware component.

14 Claims, 4 Drawing Sheets

(51) Int. Cl.
*G06F 13/38* (2006.01)
*G06F 13/42* (2006.01)

(56) References Cited

U.S. PATENT DOCUMENTS

| | | | | |
|---|---|---|---|---|
| 6,161,157 A * | 12/2000 | Tripathi | ............. | G06F 13/4045 710/104 |
| 7,376,779 B2 * | 5/2008 | Chu | ......................... | G06F 1/12 709/227 |
| 7,836,237 B2 * | 11/2010 | Lien | ..................... | G06F 13/387 361/679.32 |
| 8,015,331 B2 * | 9/2011 | Sampath | ................. | H04L 67/34 710/62 |
| 8,756,359 B2 * | 6/2014 | Chu | ......................... | G06F 1/12 710/313 |
| 2009/0113458 A1 | 4/2009 | Finger et al. | | |
| 2010/0228816 A1 | 9/2010 | Jhou et al. | | |

OTHER PUBLICATIONS

Written Opinion issued in PCT/CN2011/084283 mailed Mar. 22, 2012 (4 pages).
Abstract of CN1987791A (1 page).
Abstract of CN101093448A (1 page).

* cited by examiner

MULTI-PART ELECTRONIC DEVICE AND DATA TRANSMISSION METHOD

TECHNICAL FIELD

The present invention relates to electronic devices, and more particularly, to an electronic device and a data transmission method.

BACKGROUND

An electronic device of hybrid architecture includes two parts, a first part and a second part, each of which is provided with its own main board, processor and so on. One of the two parts is capable of operating independently, for example, as a PAD, and the two parts can be connected with each other to operate as a whole.

In the electronic device of the above architecture, the part capable of operating independently includes a number of hardware components such as a wireless network adapter, a camera, a touch screen and a sensor. When the two parts are connected with each other, problems with component sharing may occur if these hardware components are to be used by the system operating as a whole.

Conventionally, such sharing is achieved by using a switcher in the form of a hardware circuit. That is, the hardware components can be switched, via a hardware circuit, from being connected to a first main board to being connected to a second main board. In this way the hardware components can be shared.

However, during implementation of the embodiments of the present application, the inventors found at least the following problems in the prior art. A hardware switcher is required, thereby increasing cost and complexity in hardware design and layout. Meanwhile, since each component may have its unique interface, the hardware switcher needs to be compatible with all the interface specifications. This also adds to difficulty in hardware design.

SUMMARY

It is an object of the present invention to provide an electronic device and a data transmission method that can achieve sharing of hardware components in a simple and efficient way.

In order to achieve the above object, an electronic device is provided according to an embodiment of the present invention. The electronic device includes: a first part including a first main board, a first processor connected to the first main board, at least one sharable hardware component and a first connector; and a second part including a second main board, a second processor connected to the second main board and a second connector corresponding to the first connector, wherein the first part and the second part are connectable to each other via the first connector and the second connector, and the first connector is configured to receive, from a first driving module of the hardware component, a first data sent by the hardware component via a first connector driving module and transmit the first data to the second connector, such that a second connector driving module can provide the first data from the second connector to a first application running in the second part via a second driving module of the hardware component.

In the above electronic device, the first part includes a plurality of the sharable hardware components, the first connector driving module is configured to encapsulate, in a first data packet, the first data and a component identifier of one of the hardware components that sends the first data, and the first connector is configured to transmit the first data packet to the second connector such that after obtaining the first data packet via the second connector, the second connector driving module can provide, based on the component identifier in the first data packet, the first data in the first data packet to the first application running in the second part via a driving module of the hardware component corresponding to the component identifier.

In order to achieve the above object, a first electronic device is provided according to an embodiment of the present invention. The first electronic device includes: a first main board, a first processor connected to the first main board, at least one sharable hardware component and a first connector, wherein the first connector is configured to connect to a second connector included in a second electronic device, the second electronic device further including a second main board and a second processor connected to the second main board;

the first connector is further configured to receive a first data sent by the hardware component via a first connector driving module and a first driving module of the hardware component and transmit the first data to the second connector, such that a second connector driving module can provide the first data from the second connector to a first application running in the second electronic device via a second driving module of the hardware component.

In the above first electronic device, the first electronic device comprises a plurality of the sharable hardware components, the first connector driving module is configured to encapsulate, in a first data packet, the first data and a component identifier of one of the hardware components that sends the first data, and the first connector is configured to transmit the first data packet to the second connector, such that after obtaining the first data packet via the second connector, the second connector driving module can provide, based on the component identifier in the first data packet, the first data in the first data packet to the first application running in the second electronic device via a driving module of the hardware component corresponding to the component identifier.

In order to achieve the above object, a second electronic device is provided according to an embodiment of the present invention. The second electronic device includes: A second electronic device comprising a second main board, a second processor connected to the second main board and a second connector, wherein the second connector is configured to connect to a first connector included in a first electronic device, the first electronic device further including a first main board, a first processor connected to the first main board and at least one sharable hardware component, and the second connector is configured to transmit a first data received from the first connector to a second connector driving module, such that the second connector driving module can provide the first data to a first application running in the second electronic device via a second driving module of the hardware component, wherein the first data is sent by the hardware component and received by the first connector via a first connector driving module and the first driving module of the hardware component.

In the above second electronic device, the first electronic device comprises a plurality of the sharable hardware components, and the second connector is configured to receive a first data packet from the first connector and transmit the first data packet to the second connector driving module, such that the second connector driving module can provide, based on a component identifier in the first data packet, the first data in the first data packet to the first application running in the second electronic device via a driving module of a hardware component corresponding to the component identifier, wherein the first data packet is generated at the first connector driving module by encapsulating the first data and the component identifier of one of the hardware components that sends the first data.

In order to achieve the above object, an electronic device is provided according to an embodiment of the present invention. The electronic device includes: a first part including a first main board, a first processor connected to the first main board, at least one sharable hardware component and a first connector; and a second part including a second main board, a second processor connected to the second main board and a second connector corresponding to the first connector, wherein the first part and the second part are connectable to each other via the first connector and the second connector, the second connector is configured to receive, from a second driving module of the hardware component, a second data originated from a second application running in the second part via a second connector driving module, and transmit the second data to the first connector, such that a first connector driving module can obtain the second data from the first connector and transmit the second data to the hardware component via a first driving module of the hardware component, and the hardware component is configured to respond to the second data.

In the above electronic device, the first part includes a plurality of the sharable hardware components, the second connector driving module is configured to encapsulate, in a second data packet, the second data and a component identifier of one of the hardware components that is a target of the second data, and the second connector is configured to transmit the second data packet to the first connector, such that after obtaining the second data packet from the first connector, the first connector driving module can transmit, based on the component identifier in the second data packet, the second data in the second data packet to the target hardware component via a driving module of the target hardware component corresponding to the component identifier.

In order to achieve the above object, a first electronic device is provided according to an embodiment of the present invention. The first electronic device includes: a first main board, a first processor connected to the first main board, at least one sharable hardware component and a first connector, wherein the first connector is configured to connect to a second connector included in a second electronic device, the second electronic device further including a second main board and a second processor connected to the second main board, and the first connector is further configured to transmit a second data from the second connector to a first connector driving module, such that the first connector driving module can transmit the second data from the first connector to the hardware component via a first driving module of the hardware component, wherein the second data is originated from a second application running in the second electronic device and received by the second connector via a second connector driving module and a second driving module of the hardware component.

In the above first electronic device, the first electronic device comprises a plurality of the sharable hardware components, the first connector is configured to transmit a second data packet from the second connector to the first connector driving module, such that the first connector driving module can transmit, based on a component identifier in the second data packet, the second data in the second data packet to a target hardware component corresponding to the component identifier via a driving module of the target hardware component, wherein the second data packet is generated at the second connector driving module by encapsulating the second data and the component identifier of the target hardware component to which the second data is destined.

In order to achieve the above object, a second electronic device is provided according to an embodiment of the present invention. The second electronic device includes: a second main board, a second processor connected to the second main board and a second connector, wherein the second connector is configured to connect to a first connector included in a first electronic device, the first electronic device further including a first main board, a first processor connected to the first main board and at least one sharable hardware component, and the second connector is further configured to receive, from a second driving module of the hardware component, a second data originated from a second application running in the second electronic device via a second connector driving module and transmit the second data to the first connector, such that a first connector driving module can obtain the second data from the first connector and transmit the second data to the hardware component via a first driving module of the hardware component.

In the above second electronic device, the first electronic device comprises a plurality of the sharable hardware components, the second connector driving module is configured to encapsulate, in a second data packet, the second data and a component identifier of one of the hardware components that is a target of the second data, and the second connector is configured to transmit the second data packet to the first connector, such that after obtaining the second data packet via the first connector, the first connector driving module can transmit, based on the component identifier in the second data packet, the second data in the second data packet to the target hardware component via a driving module of the target hardware component corresponding to the component identifier.

In order to achieve the above object, a method for data transmission between a first part and a second part, the first part and the second part being connectable via a first connector and a second connector corresponding to the first connector, the first part including at least one sharable hardware component, the method comprising: receiving, by a first driving module running in an operating system of the first part, a first data sent from the hardware component; transmitting, by the first driving module, the first data to a first connector driving module; transmitting, by the first connector driving module, the first data to a second connector driving module via a data channel formed by connecting the first connector and the second connector; transmitting, by the second connector driving module, the first data from the second connector to a second driving module running in an operating system of the second part; and providing, by the second driving module, the first data to a first application running in the second part.

In order to achieve the above object, a method for data transmission between a first part and a second part is provided. The first part and the second part are connectable via a first connector and a second connector corresponding to the first connector. The first part includes at least one sharable hardware component. The method includes: receiving, by a second driving module running in an operating system of the first part, a second data sent from a second application in the second part; transmitting, by the second driving module, the second data to a second connector driving module; transmitting, by the second connector driving module, the second data to a first connector driving module via a data channel formed by connecting the first connector and the second connector; transmitting, by the first connector driving module, the second data from the first connector to a first driving module running in an operating system of the second part; and providing, by the first driving module, the second data to the hardware component.

The embodiments of the present invention have the following advantageous effects.

In the embodiments of the present invention, the operating systems of the two parts are each provided with a driving module for the hardware component, such that the driving module for the hardware component in the first part is capable of interacting with the hardware component, while the driving module for the hardware component in the second part is capable of interacting with the application. Meanwhile, a hardware data channel formed by connecting the first connector and the second connector is established between the two driving modules. Thus, the embodiments of the present invention enable data interaction between an application and a hardware component located in different parts.

In addition, in the conventional electronic device, there are typically connectors between the first part and the second part. The above connectors of the present invention can be implemented by multiplexing the existing connectors, thereby reducing cost required for implementing the present invention.

Further, data routing is performed by means of setting IDs for the hardware components. In this way, no matter how many components are to be shared, these components can be encapsulated in a unified form by using by the connector driving module, and the destination can be determined by using a hardware component ID. Thus, the electronic device according to the embodiments of the present invention can be free from the restriction on hardware component interface. Any components having either USB, I2C or SPI interface can be shared in the same manner. Therefore, it is possible to achieve simple and effective sharing of a hardware component.

DETAILED DESCRIPTION OF THE EMBODIMENTS

Figure 1:
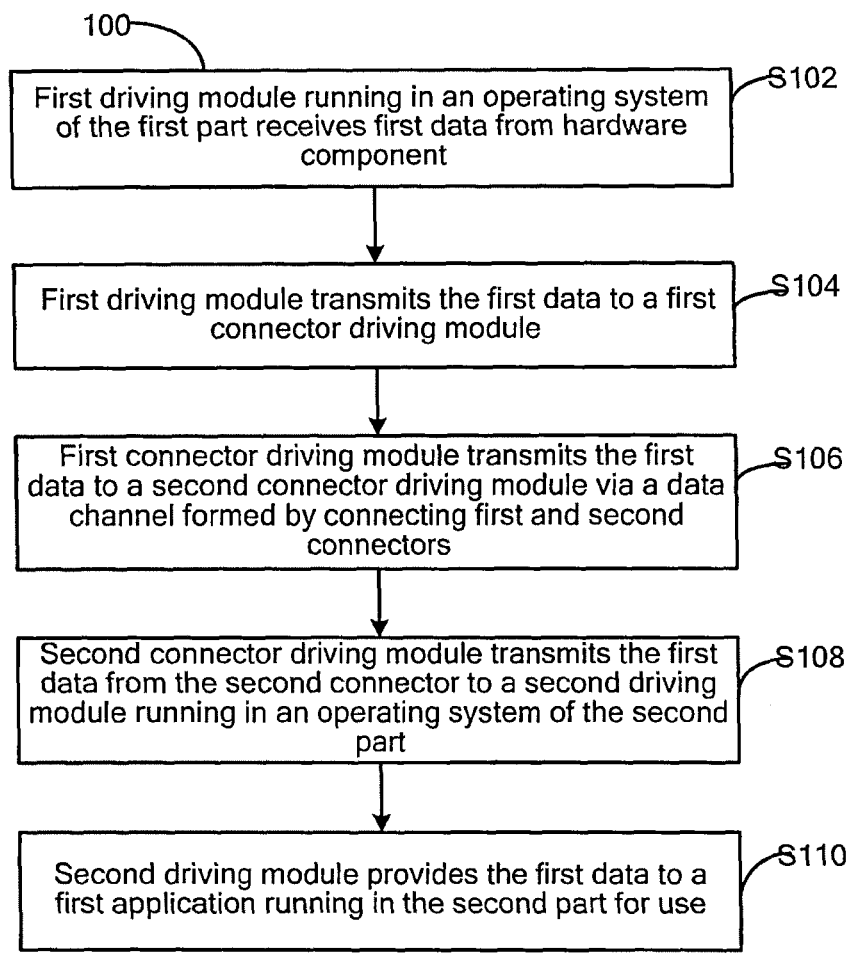
FIG. 1 is a flowchart illustrating a method according to a first embodiment of the present invention.

In an electronic devices and a data transmission according to embodiments of the present invention, the electronic device includes a first part and a second part each provided with its own main board, processor and the like and operating independently. However, when the two parts are connected with each other, they can operate as a single system in a cooperative manner. In this case, the first part and the second part can be connected via corresponding connectors. A driving module is provided in each of the first part and the second part for a hardware component. Data can be transferred between the two driving modules over a data channel formed by connecting the corresponding connectors. Thus, it is possible to achieve simple and effective sharing of the hardware component.

According to a first embodiment of the present invention, an electronic device includes: a first part including a first main board, a first processor connected to the first main board, at least one sharable hardware component and a first connector; and a second part including a second main board, a second processor connected to the second main board and a second connector corresponding to the first connector. The first part and the second part are connectable to each other via the first connector and the second connector. The first connector is configured to receive, from a first driving module of the hardware component, a first data from the hardware component via a first connector driving module, and transmit the first data to the second connector so that a second connector driving module can provide the first data from the second connector to a first application running in the second part via a second driving module of the hardware component.

Here, the first part may be a first electronic device, and the second part may be a second electronic device. In this case, the first electronic device includes a first main board, a first processor connected to the first main board, at least one sharable hardware component and a first connector.

The first connector is configured to connect to a second connector included in the second electronic device. The second electronic device further includes a second main board and a second processor connected to the second main board.

The first connector is further configured to receive a first data from the hardware component via a first connector driving module and a first driving module of the hardware component, and transmit the first data to the second connector such that a second connector driving module can provide the first data from the second connector to a first application running in the second electronic device via a second driving module of the hardware component.

The second electronic device includes a second main board, a second processor connected to the second main board, and a second connector.

The second connector is configured to connect to a first connector included in the first electronic device. The first electronic device further includes a first main board, a first processor connected to the first main board, and at least one sharable hardware component.

The second connector is configured to transmit a first data received from the first connector to a second connector driving module, such that the second connector driving module can provide the first data to a first application running in the second electronic device via a second driving module of the hardware component. The first data is from the hardware component and received by the first connector via a first connector driving module and the first driving module of the hardware component.

The operation of the electronic device according to this embodiment of the present invention will be explained in detail with reference to an example in which the sharable hardware component is a touch screen.

A user touches a touch screen located in the first part.

A touch screen driver in an operating system running on the first part obtains an input data from interaction with the touch screen.

The touch screen driver transmits the input data to a first connector driver in the operating system of the first part.

The first connector driver encapsulates the data in a data packet and transmits it to a second connector driver via a data channel between the first and second connectors.

After receiving the data packet, the second connector driver unwraps the data packet and forwards the data to a touch screen driver in an operating system running on the second part.

The touch screen driver in the operating system of the second part transmits the data to an application, such that the data can be used by the application.

With the above process, a pointer trace detected by the touch screen in the first part can be transferred to the application running in the second part without any hardware switch. In this way, it is possible to achieve simple and effective sharing of the hardware component.

In the above process, the data collected by the shared hardware component is transferred to the application. In the electronic device according to a second embodiment of the present invention, a data of an application is transferred to a hardware component for outputting. The electronic device according to the second embodiment of the present invention includes: a first part including a first main board, a first processor connected to the first main board, at least one sharable hardware component and a first connector; and a second part including a second main board, a second processor connected to the second main board and a second connector corresponding to the first connector. The first part and the second part are connectable to each other via the first connector and the second connector. The second connector is configured to receive, from a second driving module of the hardware component, a second data from a second application running in the second part via a second connector driving module, and transmit the second data to the first connector such that a first connector driving module can obtain the second data from the first connector and transmit the second data to the hardware component via a first driving module of the hardware component.

In the second embodiment, the first electronic device includes a first main board, a first processor connected to the first main board, at least one sharable hardware component, and a first connector.

The first connector is configured to connect to the second connector included in the second electronic device. The second electronic device further includes a second main board, and a second processor connected to the second main board.

The first connector is configured to transmit the second data from the second connector to the first connector driving module, such that the first connector driving module can transmit the second data from the first connector to the hardware component via the first driving module of the hardware component. The second data is from the second application running in the second electronic device, and received by the second connector via the second connector driving module and the second driving module of the hardware component.

There are a plurality of sharable hardware components. The first connector is particularly configured to transmit a second data packet from the second connector to the first connector driving module, such that the first connector driving module can transmit, based on a component identifier in the second data packet, the second data in the second data packet to a target hardware component corresponding to the component identifier via a driving module of the target hardware component.

The second data packet is generated at the second connector driving module by encapsulating the second data and the component identifier of the target hardware component to which the second data is destined.

In the second embodiment, the second electronic device includes a second main board, a second processor connected to the second main board, and a second connector.

The second connector is configured to connect to the first connector included in the first electronic device. The first electronic device further includes a first main board, a first processor connected to the first main board, and at least one sharable hardware component.

The second connector is configured to receive, from a second driving module of the hardware component, a second data from a second application running in the second electronic device via a second connector driving module, and transmit the second data to the first connector, such that a first connector driving module can obtain the second data from the first connector and transmit the second data to the hardware component via a first driving module of the hardware component.

When there are a plurality of sharable hardware components, the second connector driving module is configured to encapsulate, in a second data packet, the second data and a component identifier of a target hardware component to which the second data is destined, and the second connector is configured to transmit the second data packet to the first connector such that the first connector driving module can transmit, after obtaining the second data packet via the first connector, the second data in the second data packet to the target hardware component via a driving module of the target hardware component corresponding to the component identifier based on the component identifier in the second data packet.

The operation of the electronic device according to this embodiment of the present invention will be explained in detail with reference to an example in which the sharable hardware component is an audio adapter.

Audio player software running in the second part opens an audio file (such as an MP3 file or a WAV file).

The audio player software transmits an audio data extracted from the audio file to an audio adapter driver in an operating system running in the second part.

The audio adapter driver in the operating system running in the second part transmits the audio data to a connector driver in the operating system running in the second part.

The connector driver in the operating system running in the second part encapsulates the audio data in a data packet and transmits it to a connector driver in an operating system running in the first part over a data channel between the first connector and the second connector.

The connector driver in the operating system running in the first part unwraps the data packet and transmits the data to an audio adapter driver in the operation system running in the first part.

The audio adapter driver in the operation system running in the first part transmits the audio data to the audio adapter for playing.

According to the embodiments of the present invention, data interaction between the application running in the second part and the hardware component in the first part is desired. Since, in the case where the operating system of each of the first and second parts is configured with a driving module of the hardware component, the interaction with the hardware can be achieved via the driving module of the hardware component in the first part and the interaction with the application can be achieved via the driving module of the hardware component in the second part, in order to establish a data channel between the application running in the second part and the hardware component in the first part, a channel can be established between the driving modules of the hardware component in the operating systems of the first and second parts. This channel can be established using the first connector, the second connector and their respective connector drivers.

Since in the conventional electronic device, there are typically connectors between the first part and the second part, such connectors can be multiplexed as s the connectors of the present invention. The embodiments of the present invention are not limited to any particular scheme for data transmission between the first connector and the second connector. Any data transmission scheme can be used as long as the data can be delivered.

It can be seen from the above description that there are two driving modules for a single hardware component. An important role of the driving modules is converting data format between an application and a hardware component to enable the application and the hardware component to recognize any received data. When there are two driving modules, the conversion operation can be carried out by any one of the driving modules, while the other one can simply provide an access interface. An example will be given below.

For the above audio data, as an example, the audio data output from the audio player software can be converted by the audio adapter driver in the operating system of the second part. In this case, the audio adapter driver in the operating system of the first part does not need to convert its received data, but simply provides a channel to forward the data to the audio adapter.

Apparently, the audio data output from the audio player software can be converted by the audio adapter driver in the operating system of the first part. In this case, the audio adapter driver in the operating system of the second part does not need to convert its received data, but simply provides an interface to receive data output from the application.

The above two embodiments describe a process for obtaining data from a hardware component and a process for transmitting data to a hardware component, respectively. However, sometimes both of the processes co-exist, for example, when data is read from a memory, modified and then stored in the memory. In this case, the two processes are substantially independent from each other. The two processes correspond to the above explained processes, respectively, and their details will be thus omitted here.

In the above examples, there is only one shared component. When there is a plurality of shared components, the first connector driving module in the first embodiment of the present invention is configured to encapsulate in a first data packet the first data and a component identifier of a hardware component from which the first data is sent.

The first connector is configured to transmit the first data packet to the second connector to enable the second connector driving module to provide, after obtaining the first data packet via the second connector, the first data in the first data packet to the first application running in the second part via a driving module of the hardware component corresponding to the component identifier based on the component identifier in the first data packet.

When there is a plurality of sharable hardware components, the first connector driving module is configured to encapsulate, in a first data packet, the first data and a component identifier of a hardware component from which the first data is sent, and the first connector is configured to transmit the first data packet to the second connector to enable the second connector driving module to provide, after obtaining the first data packet via the second connector, the first data in the first data packet to the first application running in the second electronic device via a driving module of the hardware component corresponding to the component identifier based on the component identifier in the first data packet.

When there is a plurality of sharable hardware components, the second connector is configured to receive a first data packet from the first connector, and transmit the first data packet to the second connector driving module to enable the second connector driving module to provide, based on a component identifier in the first data packet, the first data in the first data packet to the first application running in the second electronic device via a driving module of a hardware component corresponding to the component identifier.

The first data packet is generated at the first connector driving module by encapsulating the first data and the component identifier of a hardware component from which the first data is sent.

In the following example, the shared components include a touch screen, a camera and a network adapter.

A user touches a touch screen in the first part.

A touch screen driver in an operating system running on the first part obtains an input data from interaction with the touch screen.

The touch screen driver transmits the input data to a first connector driver in the operating system of the first part.

The first connector driver encapsulates the data in a data packet and transmits it to a second connector driver via a data channel between the first connector and the second connector.

In this case, the data packet includes at least the original data and the component identifier of the hardware component from which the data is sent (in this case, the touch screen having a preset component identifier of 1).

After receiving the data packet, the second connector driver unwraps the data packet to obtain the component identifier and the original data. Then, the second connector driver forwards the original data to a touch screen driver in an operating system running in the second part based on the component identifier.

The touch screen driver in the operating system running in the second part transmits the data to an application such that the data can be used by the application.

Similarly, in the case where data is to be transmitted to a plurality of sharable hardware components, the second connector driving module is configured to encapsulate the second data and a component identifier of a target hardware component to which the second data is destined in a second data packet, and the second connector is configured to transmit the second data packet to the first connector to enable the first connector driving module to transmit, after obtaining the second data packet from the first connector, the second data in the second data packet to the target hardware component via a driving module of the target hardware component corresponding to the component identifier based on the component identifier in the second data packet.

The operation of the electronic device according to this embodiment of the present invention will be explained in detail with reference to an example in which the sharable hardware components includes an audio adapter and a vibration motor.

Audio player software running in the second part opens an audio file (such as an MP3 file or a WAV file).

The audio player software transmits an audio data extracted from the audio file to an audio adapter driver in an operating system running in the second part.

The audio adapter driver in the operating system running in the second part transmits the audio data to a connector driver in the operating system running in the second part.

The connector driver in the operating system running in the second part encapsulates the audio data in a data packet and transmits it to a connector driver in an operating system running in the first part over a data channel between the first connector and the second connector.

In this case, the data packet includes the audio data and a component identifier of the target hardware component (the audio adapter in this case).

The connector driver in the operating system running in the first part unwraps the data packet to obtain the audio data and the component identifier of the target hardware component (the audio adapter in this case). Then the audio can be transmitted data to an audio adapter driver in the operation system running in the first part.

The audio adapter driver in the operation system running in the first part transmits the audio data to the audio adapter for playing.

With the above configuration, no matter how many components are to be shared, these components can be encapsulated in a unified manner by using the connector driving module, and the destination can be determined by means of the identifier of the hardware component. Thus, the electronic device according to the embodiments of the present invention can be free from the restriction on hardware component interface. Any components having either USB, I2C or SPI interface can be shared in the same way. Therefore, it is possible to achieve simple and effective sharing of hardware component.

According to an embodiment of the present invention, a method for data transmission between a first part and a second part is provided. The first part and the second part are connectable via a first connector and a second connector corresponding to the first connector. The first part includes at least one sharable hardware component. As shown in FIG. 1, the method includes the following steps.

At step S102, a first driving module running in an operating system of the first part receives a first data from the hardware component.

At step S104, the first driving module transmits the first data to a first connector driving module.

At step S106, the first connector driving module transmits the first data to a second connector driving module via a data channel formed by connecting the first connector and the second connector.

At step S108, the second connector driving module transmits the first data from the second connector to a second driving module running in an operating system of the second part.

At step S110, the second driving module provides the first data to a first application running in the second part.

Figure 2:
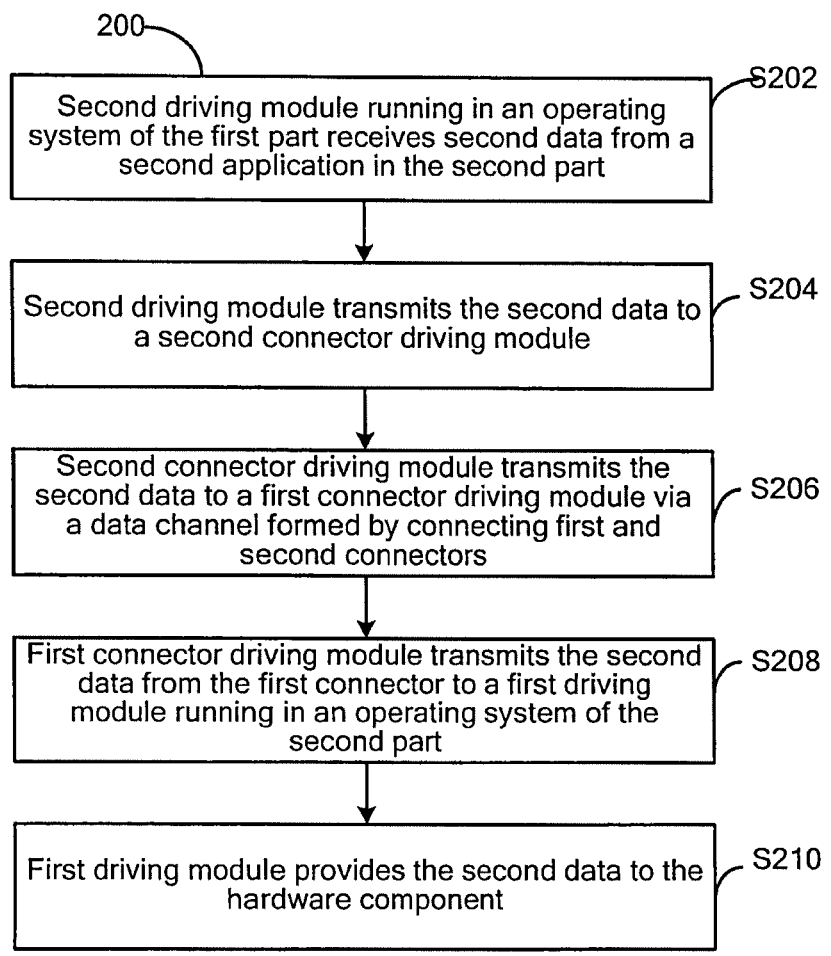
FIG. 2 is a flowchart illustrating a method according to a second embodiment of the present invention.

According to an embodiment of the present invention, a method for data transmission between a first part and a second part is provided. The first part and the second part are connectable via a first connector and a second connector corresponding to the first connector. The first part includes at least one sharable hardware component. As shown in FIG. 2, the method includes the following steps.

At step S202, a second driving module running in an operating system of the first part receives a second data from a second application in the second part.

At step S204, the second driving module transmits the second data to a second connector driving module.

At step S206, the second connector driving module transmits the second data to a first connector driving module via a data channel formed by connecting the first connector and the second connector.

At step S208, the first connector driving module transmits the second data from the first connector to a first driving module running in an operating system of the second part.

At step S210, the first driving module provides the second data to the hardware component.

In the above embodiments, there is no need to determine whether the first part and the second part are connected with each other. When they are disconnected from each other, since the connectors are disconnected, the data transmitted from MCU/EC to the first/second connector will be simply discarded by the first/second connector. When they are connected with each other, since the connectors are connected, a data link is formed between the connectors, and the data transmitted from MCU/EC to the first/second connector will be forwarded by the first/second connector to the second/first connector accordingly.

Alternatively, in an embodiment of the present invention, in order to ensure the validity of data, it can be detected whether the first part and the second part are connected with each other via the corresponding first and second connectors, and perform the subsequent process based on the connection status: That is, when MCU detects the connection, it will transmit the data from the sharable hardware component to the first connector, which in turn forwards the data to the second connector. Meanwhile, the data received from the first connector can be transmitted to the sharable hardware component via the connector driver and the driver of the hardware component. When the MCU fails to detect the connection, it will operate in a conventional way, i.e., to transmit the data originated from the sharable hardware component to a corresponding application for processing, and/or transmit the data to be transmitted to the sharable hardware component to the hardware component.

For the second part, when the EC detects the connection, it will transmit the data sent from the sharable hardware component and received by the second connector to the application running in the second part. Meanwhile, when the data to be transmitted via the connector is received, the data will be transmitted to the first connector via the second connector. The sharable hardware component is provided in the first part but not in the second part. Thus, when the EC fails to detect the connection, the sharable hardware component cannot be used from the second part. In this case, there is no data to be transmitted to the hardware component, and the second connector will not receive any data from the first connector.

Figure 3:
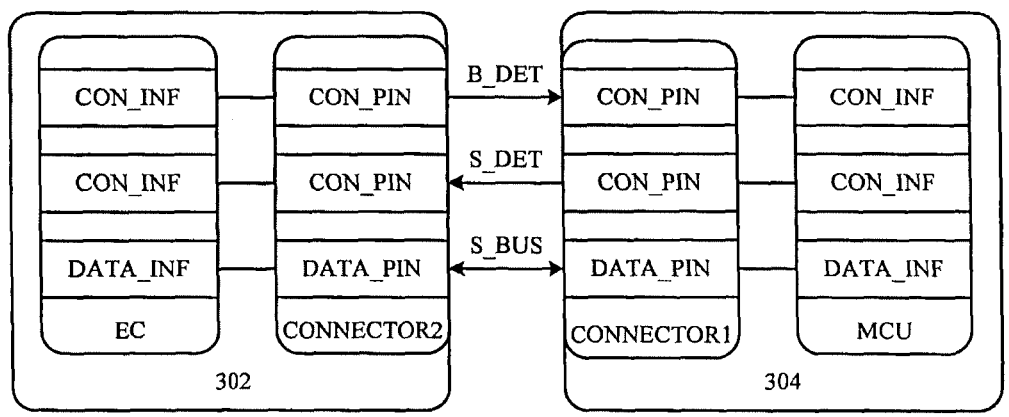
FIG. 3 is a schematic diagram showing structures and connections of processors and connectors in the first part and the second part according to an embodiment of the present invention.

FIG. 3 is a schematic diagram showing structures and connections of the processors and connectors in the first part and the second part according to an embodiment of the present invention. As shown in FIG. 3, it is assumed that the second part 302 including an Embedded Controller (EC) serves as a master system, and the first part 304 including a Micro Control Unit (MCU) serves as a slave system. Each of the EC and the MCU is provided with physical interfaces including a connection detection interface, CON_INF, and a data transmission interface, DATA_INF. In addition, Each of the first connector, CONNECTOR 1, and the second connector, CONNECTOR 2, is provided with a connection detection pin, CON_PIN and a data transmission pin, DATA_PIN, which are connected to the connection detection interface CON_INF and the data transmission interface DATA_INF, respectively.

The EC and the MCU determine whether the first connector CONNECTOR1 and the second connector CONNECTOR2 are connected with each other via the connection detection interface CON_INF and the connection detection pin CON_PIN, and transmit data to the corresponding connector when it determines that the first connector CONNECTOR1 and the second connector CONNECTOR2 are connected with each other.

As shown in FIG. 3, a first signal B_DET of the master system is transmitted from the EC to the MCU when the master system and the slave system are connected. Then the MCU can detect the presence of the master system based on the first signal. A second signal S_DET of the slave system is transmitted from the MCU to the EC when the master system and the slave system are connected. Then the EC can detect the presence of the slave system based on the second signal. S_BUS is a serial communication bus (e.g., I2C (Inter-Integrated Circuit), SPI (Serial Peripheral Interface) or UART (Universal Asynchronous Receiver/Transmitter)) which forms a data transmission channel between the master system and the slave system when they are connected.

With the above configuration, it is possible to detect whether the first connector CONNECTOR1 and the second connector CONNECTOR2 are connected with each other via the connection detection pin. The MCU/EC will transmit data to each other via the first/second connector only when the first connector CONNECTOR1 and the second connector CONNECTOR2 are connected with each other.

Figure 4:
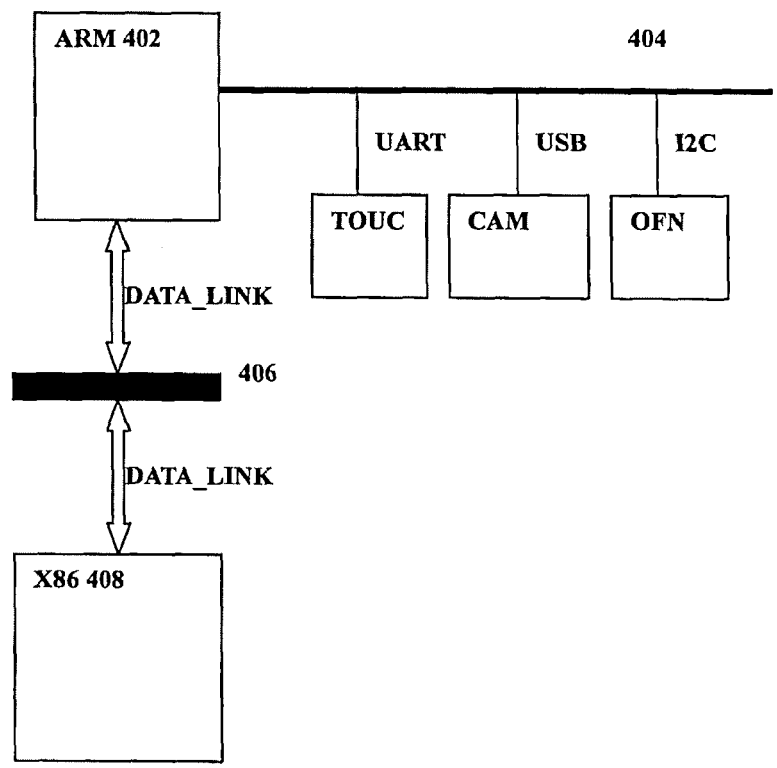
FIG. 4 and FIG. 5 are schematic diagrams respectively showing hardware and software architectures of an embodiment of the present invention.

FIG. 4 is a schematic diagram of hardware architecture according to an embodiment of the present invention. The hardware architecture includes two parts, one is an ARM system 402 having shared hardware components (touch screen TOUC, camera CAM and optical finger navigation component OFN) connected to the ARM system 402 via a bus 404. The ARM system is connected to an X86 system 408 via a connector 406 and a data link DATA_LINK.

Figure 5:
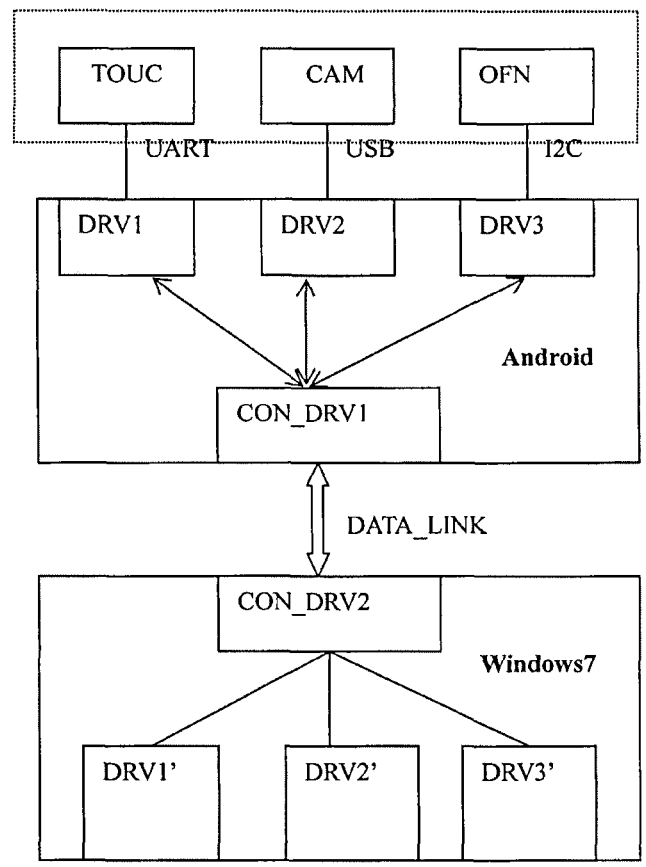

FIG. 5 is a schematic diagram of software architecture according to an embodiment of the present invention. Drivers/driving modules DRV1, DRV2 and DRV3 for various shared hardware components (touch screen TOUC, camera CAM and optical finger navigation component OFN) are loaded in an Andriod operating system. During a normal operation of the Andriod operating system, the driving modules DRV1, DRV2 and DRV3 interact normally with their respective hardware components according to their respective protocols. The driving modules DRV1, DRV2 and DRV3 in the Andriod operating system of the electronic device are real driving modules. When another system (e.g., a Windows 7 operating system) is connected to execute applications associated with the hardware components in the Windows 7 system, the drivers/driving modules DRV1, DRV2 and DRV3 of the shared components are connected to a connector driver CON_DRV1. The Windows 7 operating system is equipped with a corresponding CON_DRV2 and the drivers DRV1', DRV2' and DRV3' of the above shared components. These drivers interact with applications in the Windows 7 system and are all connected to the connector driver CON_DRV2. The driving modules DRV1', DRV2' and DRV3' in the Windows 7 operating system of the electronic device are virtual driving modules, since there is no real hardware component corresponding to the driving modules DRV1', DRV2' and DRV3' under the Windows 7 operating system. Further, only when the driving modules DRV1', DRV2' and DRV3' in the Windows 7 operating system of the electronic device detect connection between the two systems, the Windows 7 operating system can recognize/load these driving modules DRV1', DRV2' and DRV3'. The connector drivers CON_DRV1 and CON_DRV2 in the two operating systems are connected with each other via the data link DATA_LINK or a data channel formed by connecting the connectors. For example, when the driving module DRV2 in the Andriod operating system receives a data from the CAM, the driving module DRV2 transmits the data to the connector driving module CON_DRV1, which then transmits the data to the connector driving module CON_DRV2 via the data channel. The connector driving module CON_DRV2 transmits the received data to the corresponding driving module DRV2 in the Windows 7 system, which in turn provides the data to the application running in the Windows 7 system.

Conventionally, each of the two connectors must be equipped with pins corresponding to each of the hardware components. For example, at least two pins are to be provided according to the USB protocol for the camera CAM. Thus, a large number of pins are required in the connectors, and the pins are long in length. According to the embodiments of the present invention, a connector driving module is provided, and thus just three pairs of pins are required between the two connectors for connection detection and data transmission with reference to FIG. 3. This reduces the number of pins and the length of each pin. Further, data routing is performed by means of setting IDs for the hardware components. In this way, no matter how many components are to be shared, these components can be encapsulated in a unified form by using by the connector driving module, and the destination can be determined by using a hardware component ID. Thus, the electronic device according to the embodiments of the present invention can be free from the restriction on hardware component interface. Any components having either USB, I2C or SPI interface can be shared in the same manner. Therefore, it is possible to achieve simple and effective sharing of a hardware component.

The present invention has been described with reference to the above embodiments. However, various modifications and alternatives can be made by those skilled in the art without departing from the scope of the present invention. These modifications and alternatives are to be encompassed by the scope of the present invention.

What is claimed is:

1. An electronic device, comprising:
a first part including a first main board, a first processor connected to the first main board, at least one sharable hardware component and a first connector; and
a second part including a second main board, a second processor connected to the second main board and a second connector corresponding to the first connector,
wherein the first part and the second part are connectable to each other via the first connector and the second connector, and
the first connector is configured to receive, from a first driving module of the hardware component, a first data sent by the hardware component via a first connector driving module and transmit the first data to the second connector, such that a second connector driving module can provide the first data from the second connector to a first application running in the second part via a second driving module of the hardware component;
the first driving module runs in an operating system of the first part, and the second driving module runs in an operating system of the second part.

2. The electronic device of claim 1, wherein the first part includes a plurality of the sharable hardware components,
the first connector driving module is configured to encapsulate, in a first data packet, the first data and a component identifier of one of the hardware components that sends the first data, and
the first connector is configured to transmit the first data packet to the second connector such that after obtaining the first data packet via the second connector, the second connector driving module can provide, based on the component identifier in the first data packet, the first data in the first data packet to the first application running in the second part via a driving module of the hardware component corresponding to the component identifier.

3. A first electronic device comprising a first main board, a first processor connected to the first main board, at least one sharable hardware component and a first connector, wherein
the first connector is configured to connect to a second connector included in a second electronic device, the second electronic device further including a second main board and a second processor connected to the second main board;
the first connector is further configured to receive a first data sent by the hardware component via a first connector driving module and a first driving module of the hardware component and transmit the first data to the second connector, such that a second connector driving module can provide the first data from the second connector to a first application running in the second electronic device via a second driving module of the hardware component;
the first driving module runs in an operating system of the first part, and the second driving module runs in an operating system of the second part.

4. The first electronic device of claim 3, wherein the first electronic device comprises a plurality of the sharable hardware components,
the first connector driving module is configured to encapsulate, in a first data packet, the first data and a component identifier of one of the hardware components that sends the first data, and
the first connector is configured to transmit the first data packet to the second connector, such that after obtaining the first data packet via the second connector, the second connector driving module can provide, based on the component identifier in the first data packet, the first data in the first data packet to the first application running in the second electronic device via a driving module of the hardware component corresponding to the component identifier.

5. A second electronic device comprising a second main board, a second processor connected to the second main board and a second connector, wherein
the second connector is configured to connect to a first connector included in a first electronic device, the first electronic device further including a first main board, a first processor connected to the first main board and at least one sharable hardware component, and
the second connector is configured to transmit a first data received from the first connector to a second connector driving module, such that the second connector driving module can provide the first data to a first application running in the second electronic device via a second driving module of the hardware component,
wherein the first data is sent by the hardware component and received by the first connector via a first connector driving module and the first driving module of the hardware component;
the first driving module runs in an operating system of the first part, and the second driving module runs in an operating system of the second part.

6. The second electronic device of claim 5, wherein the first electronic device comprises a plurality of the shamble hardware components, and
the second connector is configured to receive a first data packet from the first connector and transmit the first data packet to the second connector driving module, such that the second connector driving module can provide, based on a component identifier in the first data packet, the first data in the first data packet to the first application running in the second electronic device via a driving module of a hardware component corresponding to the component identifier,
wherein the first data packet is generated at the first connector driving module by encapsulating the first data and the component identifier of one of the hardware components that sends the first data.

7. An electronic device, comprising:
a first part including a first main board, a first processor connected to the first main board, at least one sharable hardware component and a first connector; and
a second part including a second main board, a second processor connected to the second main board and a second connector corresponding to the first connector,
wherein the first part and the second part are connectable to each other via the first connector and the second connector,
the second connector is configured to receive, from a second driving module of the hardware component, a second data originated from a second application running in the second part via a second connector driving module, and transmit the second data to the first connector, such that a first connector driving module can obtain the second data from the first connector and transmit the second data to the hardware component via a first driving module of the hardware component, and
the hardware component is configured to respond to the second data;

the first driving module runs in an operating system of the first part, and the second driving module runs in an operating system of the second part.

8. The electronic device of claim 7, wherein the first part includes a plurality of the sharable hardware components,
the second connector driving module is configured to encapsulate, in a second data packet, the second data and a component identifier of one of the hardware components that is a target of the second data, and
the second connector is configured to transmit the second data packet to the first connector, such that after obtaining the second data packet from the first connector, the first connector driving module can transmit, based on the component identifier in the second data packet, the second data in the second data packet to the target hardware component via a driving module of the target hardware component corresponding to the component identifier.

9. A first electronic device comprising a first main board, a first processor connected to the first main board, at least one sharable hardware component and a first connector, wherein
the first connector is configured to connect to a second connector included in a second electronic device, the second electronic device further including a second main board and a second processor connected to the second main board, and
the first connector is further configured to transmit a second data from the second connector to a first connector driving module, such that the first connector driving module can transmit the second data from the first connector to the hardware component via a first driving module of the hardware component,
wherein the second data is originated from a second application running in the second electronic device and received by the second connector via a second connector driving module and a second driving module of the hardware component;
the first driving module runs in an operating system of the first part, and the second driving module runs in an operating system of the second part.

10. The first electronic device of claim 9, wherein the first electronic device comprises a plurality of the sharable hardware components,
the first connector is configured to transmit a second data packet from the second connector to the first connector driving module, such that the first connector driving module can transmit, based on a component identifier in the second data packet, the second data in the second data packet to a target hardware component corresponding to the component identifier via a driving module of the target hardware component,
wherein the second data packet is generated at the second connector driving module by encapsulating the second data and the component identifier of the target hardware component to which the second data is destined.

11. A second electronic device comprising a second main board, a second processor connected to the second main board and a second connector, wherein
the second connector is configured to connect to a first connector included in a first electronic device, the first electronic device further including a first main board, a first processor connected to the first main board and at least one sharable hardware component, and
the second connector is further configured to receive, from a second driving module of the hardware component, a second data originated from a second application running in the second electronic device via a second connector driving module and transmit the second data to the first connector, such that a first connector driving module can obtain the second data from the first connector and transmit the second data to the hardware component via a first driving module of the hardware component;
the first driving module runs in an operating system of the first part and the second driving module runs in an operating system of the second part.

12. The second electronic device of claim 11, wherein the first electronic device comprises a plurality of the sharable hardware components,
the second connector driving module is configured to encapsulate, in a second data packet, the second data and a component identifier of one of the hardware components that is a target of the second data, and
the second connector is configured to transmit the second data packet to the first connector, such that after obtaining the second data packet via the first connector, the first connector driving module can transmit, based on the component identifier in the second data packet, the second data in the second data packet to the target hardware component via a driving module of the target hardware component corresponding to the component identifier.

13. A method for data transmission between a first part and a second part, the first part and the second part being connectable via a first connector and a second connector corresponding to the first connector, the first part including at least one sharable hardware component, the method comprising:
receiving, by a first driving module running in an operating system of the first part, a first data sent from the hardware component;
transmitting, by the first driving module, the first data to a first connector driving module;
transmitting, by the first connector driving module, the first data to a second connector driving module via a data channel formed by connecting the first connector and the second connector;
transmitting, by the second connector driving module, the first data from the second connector to a second driving module running in an operating system of the second part; and
providing, by the second driving module, the first data to a first application running in the second part.

14. A method for data transmission between a first part and a second part, the first part and the second part being connectable via a first connector and a second connector corresponding to the first connector, the first part including at least one sharable hardware component, the method comprising:
receiving, by a second driving module running in an operating system of the second part, a second data sent from a second application in the second part;
transmitting, by the second driving module, the second data to a second connector driving module;
transmitting, by the second connector driving module, the second data to a first connector driving module via a data channel formed by connecting the first connector and the second connector;
transmitting, by the first connector driving module, the second data from the first connector to a first driving module running in an operating system of the first part; and
providing, by the first driving module, the second data to the hardware component.

* * * * *